US012744132B2

(12) United States Patent
Mottier et al.

(10) Patent No.: US 12,744,132 B2
(45) Date of Patent: Sep. 22, 2026

(54) TRANSFER SYSTEM FOR A SEALED ENCLOSURE HAVING A SEALED CONNECTION DEVICE FOR CONNECTING TO AN ENCLOSED VOLUME

(71) Applicant: GETINGE LIFE SCIENCE FRANCE, Vendôme (FR)

(72) Inventors: Emmanuel Mottier, Aze (FR); Florentin Cordier, Saint Firmin des Pres (FR)

(73) Assignee: GETINGE LIFE SCIENCE FRANCE, Vendôme (FR)

( * ) Notice: Subject to any disclaimer, the term of this patent is extended or adjusted under 35 U.S.C. 154(b) by 333 days.

(21) Appl. No.: 18/550,182

(22) PCT Filed: Mar. 10, 2022

(86) PCT No.: PCT/FR2022/050428
§ 371 (c)(1),
(2) Date: Sep. 12, 2023

(87) PCT Pub. No.: WO2022/195200
PCT Pub. Date: Sep. 22, 2022

(65) Prior Publication Data

US 2024/0153660 A1 May 9, 2024

(30) Foreign Application Priority Data

Mar. 15, 2021 (FR) ...................................... 2102528

(51) Int. Cl.
*G21F 7/06* (2006.01)

(52) U.S. Cl.
CPC .............. *G21F 7/067* (2013.01); *G21F 7/065* (2013.01)

(58) Field of Classification Search
None
See application file for complete search history.

(56) References Cited

U.S. PATENT DOCUMENTS 5,049,029 A 9/1991 Mitsui et al.
5,421,626 A * 6/1995 Glachet .................... F16J 13/18 292/241

(Continued)

FOREIGN PATENT DOCUMENTS

EP 3581339 A1 12/2019
EP 3496766 B1 9/2020

(Continued)

OTHER PUBLICATIONS

International Search Report for PCT/FR2022/050428 dated Jun. 7, 2022.

(Continued)

*Primary Examiner* — Steven S Paik
(74) *Attorney, Agent, or Firm* — McDonald Hopkins LLC

(57) ABSTRACT

A transfer system for a sealed enclosure, the sealed enclosure defining a first closed volume and having at least one device for sealed connection to a second closed volume, the transfer system being intended to be disposed in the enclosure and to be fastened to a wall of the latter, the transfer system including a chute and a hinge device fastened inside the enclosure, the hinge device including two arms and three pivot hinges and three motors.

13 Claims, 12 Drawing Sheets

(56) References Cited

U.S. PATENT DOCUMENTS

| | | | | |
|---|---|---|---|---|
| 5,460,439 | A * | 10/1995 | Jennrich | B01L 1/02 312/1 |
| 5,892,200 | A * | 4/1999 | Kendall | B01L 1/02 454/187 |
| 8,950,624 | B2 * | 2/2015 | Sacca | G21F 7/005 220/825 |
| 9,283,556 | B2 | 3/2016 | Armau et al. | |
| 9,754,691 | B2 | 9/2017 | Dufour et al. | |
| 11,075,018 | B2 * | 7/2021 | Aubert | B25J 1/08 |
| 2013/0167442 | A1 * | 7/2013 | Sacca | B65B 55/027 49/70 |
| 2016/0281418 | A1 | 9/2016 | Dufour et al. | |
| 2016/0376044 | A9 | 12/2016 | Procyshyn et al. | |
| 2019/0378630 | A1 | 12/2019 | Aubert et al. | |

FOREIGN PATENT DOCUMENTS

| | | | |
|---|---|---|---|
| FR | 2695343 | A1 | 3/1994 |
| JP | H04-213475 | A | 8/1992 |
| JP | H06-193323 | A | 7/1994 |
| JP | 2015-508460 | A | 3/2015 |
| JP | 2016-539342 | A | 12/2016 |
| JP | 2020-042006 | A | 3/2020 |

OTHER PUBLICATIONS

Written Opinion for PCT/FR2022/050428 dated Jun. 7, 2022.

Japanese Office Action issued in Japanese Patent Application No. 2023-557713 dated Mar. 3, 2026.

* cited by examiner

TRANSFER SYSTEM FOR A SEALED ENCLOSURE HAVING A SEALED CONNECTION DEVICE FOR CONNECTING TO AN ENCLOSED VOLUME

CROSS-REFERENCE TO RELATED APPLICATIONS

This is the National Stage application of PCT international application PCT/FR2022/050428, filed on Mar. 10, 2022, which claims the priority of French Patent Application No. 2102528, filed Mar. 15, 2021, both of which are incorporated herein by reference in their entireties.

TECHNICAL FIELD AND PRIOR ART

The present application relates to a transfer system for a sealed enclosure delimiting a closed volume intended to be connected to another closed volume, the sealed enclosure including a sealed connection device between the two closed volumes. The present invention also relates to a method for actuating said transfer system.

In many industrial sectors, including the pharmaceutical, medical, agri-food and nuclear sectors, it is necessary or desirable to perform some tasks in a confined atmosphere, either in order to protect the personnel, for example from radioactivity, toxicity . . . , or on the contrary to be able to perform these tasks in an aseptic or dust-free atmosphere, or finally both simultaneously.

The transfer of an apparatus or a product from one closed volume to another, without at any time the sealing of each of these volumes from the outside being broken, poses a delicate problem to address. This problem may be solved by a dual-door connection device. For example, such a dual-door device provided with a multi-safety control is known from the document FR 2 695 343. Each volume is closed by a door mounted in a flange. Each door is secured to its flange by a bayonet connection and the two flanges are intended to be secured to each other by a bayonet connection. This system is also referred to as RTP standing for “Rapid transfer port”.

In the case where one of the closed volumes is formed by a container and the other volume by an enclosure, for example a glove box, the transfer is performed as follows. The flange of the container includes on its outer periphery lugs intended to cooperate with an indentation of the flange of the glove box. The flange of the container is inserted into the flange of the glove box, the container is oriented so as to match the lugs with the indentation. A first rotation of the container along the axis of its door allows securing the flange of the container to the flange of the glove box by the bayonet connection. By means of a second rotation of the container, along the same axis and in continuity with the first rotation, the door of the container is pivoted relative to the container, ensuring both a connection by another bayonet connection with the door of the glove box and a separation of the new assembly formed by the two doors affixed to the door and glove box flanges. A handle control located in the glove box allows unlocking a safety mechanism and clears the passage between the two volumes. In the case of an aseptic atmosphere, the external faces of the two doors being in contact with each other in a sealed manner, they cannot contaminate the interior of the volumes or be contaminated by the internal environment of the glove box.

The container flange includes a seal which, when it is secured to the flange of the glove box, delimits with the two flanges the passage between the interior of the container and the interior of the glove box. The tip of the seal of the container flange that is not in contact with the flange of the glove box is called the “contamination ring” or “ring of concern”. Care should be taken to ensure the integrity of the container flange seal and priority should be given to avoid contact with the contamination ring during transfer, to avoid the contamination of the enclosure.

This type of enclosure is used for the manufacture of products under controlled atmosphere, for example in the pharmaceutical field for the manufacture of drugs and packaging thereof. For example, filling lines are disposed in the enclosures. Objects from the outside can then be transferred towards the interior of the enclosure, for example vials or caps. The objects are contained in a bag provided with a flange and a door, the flange being connected in a sealed manner to the flange of the enclosure. To facilitate the transfer of the objects, for example to pour them into a vibrating bowl of the filling line, a transfer system is implemented in the enclosure, including an element forming a funnel, called chute and intended to fit as a support or in the flange of the enclosure inside the enclosure to receive the objects that originate from the bag and guide them towards their destination, for example the vibrating bowl. Positioning the chute in the opening of the container flange allows covering the contamination ring.

An example of such a transfer system is described in the document EP3581339. The chute is hinged with respect to the wall of the enclosure between a docked position, in which it docks with the flange of the enclosure and borders the opening of the enclosure and a separated or rest position, in which the chute is moved away from the opening of the enclosure so as not to disturb the return of the door of the enclosure in place.

The chute is hinged on an arm which is itself hinged in rotation on the wall of the enclosure. When it is desired to set the chute in place on the opening, the arm is rotated in the direction of the wall, the chute and comes to bear against the flange of the enclosure and border its opening. To move the chute away, the arm is rotated in the reverse direction. The transfer system has a relatively reduced size. However, the rotational movement of the chute in the enclosure may cause, when docking the connection device, a friction of the docking end of the chute and of the contamination ring, and can damage the sealing.

SUMMARY OF EMBODIMENTS

Consequently, it is an aim of the present application is to describe a transfer system for a sealed enclosure limiting the friction between the chute and the contamination ring.

The aim stated hereinabove is achieved by a transfer system intended to be mounted in a sealed enclosure including a device for a sealed connection to a closed volume, said connection device including a longitudinal axis, the transfer system including a chute hingedly mounted on a portion of the enclosure by means of a hinge device enabling the chute to have, at least when approaching the connection device, a movement coaxial with the longitudinal axis of the connection device. Thus, the frictions between the chute and the contamination ring are substantially reduced, compared to a system wherein the chute docks the connection device by a rotational movement.

In one embodiment, the hinge device includes two arms connected by a pivot hinge, one of the arms is connected to the chute by a pivot hinge and the other arm is connected to the enclosure by a pivot hinge, and each pivot hinge is motor-driven. The control of the motors allows for a great freedom of movement of the chute relative to the enclosure and the implementation of two arms allows moving the chute at least during docking thereof with the connection device and during undocking thereof from the connection device along a direction coaxial with the axis of the connection device.

In another embodiment, the hinge device includes two arms and two motors.

The motors of the hinge device may be controlled, for example during an undocking phase, so that the chute has, in this order, a first exclusively translational movement according to a direction coaxial with the axis of the connection device and a second movement secant to the axis of the connection device, for example orthogonal thereto.

Preferably, the transfer system, in particular the hinge device, is fastened on the flange of the connection device mounted on the wall, which facilitates the electrical connection of the motors of the hinge device as well as the integration on the wall.

Advantageously, the chute is removably secured to the hinge device.

An object of the present application is a transfer system for a sealed enclosure, said sealed enclosure defining a first closed volume and including at least one sealed connection device with an axis intended to connect the first closed volume to a second closed volume, said transfer system being intended to be disposed in said enclosure, said transfer system including:

- a chute, said chute including:
- a docking end with a longitudinal axis configured to cooperate with the sealed connection device; and
- a spill end,
- a device for actuating the chute intended to move the chute inside the first closed volume, said hinge device including a first arm and a second arm, a first pivot hinge between a first end of the first arm and a first end of the second arm, a second pivot hinge on a second longitudinal end of the first arm intended to enable a rotational movement of the first arm relative to the interior of the first closed volume,
- a first electric motor for moving the second arm in rotation relative to the first arm,
- a second electric motor for moving the first arm in rotation relative to the enclosure,
- means for controlling at least of the first and second motors configured so that the trajectory of the chute includes, at least at the end of the phase of approaching the connection device and at the beginning of the phase of moving away from the connection device, a portion of a translational movement over a non-zero distance during which the axis of the docking end and the axis of the device connection are collinear.

Preferably, the transfer system includes a third pivot hinge between the second arm and the chute and a third electric motor for moving the chute in rotation relative to the second arm, said third motor being controlled by the control means.

Advantageously, the first motor is integrated in the first pivot hinge and/or the second motor is integrated in the second pivot hinge and/or the third motor is integrated in the third pivot hinge.

In one embodiment, the first arm and/or the second arm is or are bent.

According to an additional feature, the chute is removably mounted on the second arm.

Another object of the present application is an enclosure defining a first closed volume and including a transfer system according to the invention and a device for sealed connection to a second closed volume, said connection device being mounted in a wall of said enclosure, said connection device including a flange and a door.

For example, the hinge device is fastened on a flange of the connection device.

In an advantageous embodiment, the flange includes a passage between the interior and the exterior of the enclosure and through which pass means for electrical connection of the motors. The connection device may include automated means for opening a latch of the door and for pivoting the door activated by at least one motor and means for electrical connection of said at least one motor may pass through said passage.

According to an additional feature, the enclosure includes a system for generating a laminar flow located on one side of the connection device and the hinge device is fastened in the enclosure opposite the system for generating a laminar flow with respect to the connection device.

In another embodiment, the hinge device is fastened on a wall different from that in which the connection device is mounted.

Advantageously, the enclosure includes means (S) for detecting the configuration of the transfer system and/or of the open state of the connection device.

Another object of the present application is a method for actuating a transfer system for a sealed enclosure, said sealed enclosure defining a first closed volume and including at least one sealed connection device with an axis intended to connect the first closed volume to a second closed volume, said transfer system being intended to be disposed in said enclosure, said transfer system including:

- a chute, said chute including:
- a docking end with a longitudinal axis configured to cooperate with the sealed connection device; and
- a spill end,
- a device for actuating the chute intended to move the chute inside the first closed volume, said hinge device including a first arm and a second arm, a first pivot hinge between a first end of the first arm and a first end of the second arm, a second pivot hinge on a second longitudinal end of the first arm intended to enable a rotational movement of the first arm relative to the interior of the first closed volume,
- a first electric motor for moving the second arm in rotation relative to the first arm,
- a second electric motor for moving the first arm in rotation relative to the enclosure, said actuation method including a phase of approaching the chute of the connection device to set the chute in a docking position, and a phase of moving the chute away from the connection device to set the chute in a rest position, the chute being moved in translation over a non-zero distance so that the docking end of the chute is collinear with the axis of the connection device at the end of the approach phase and at the beginning of the separation phase.

In the case where the enclosure includes a device for generating a laminar flow along the wall including the sealed connection device, at the end of the separation phase, the chute may advantageously be disposed so as to be in the axis of the laminar flow.

BRIEF DESCRIPTION OF THE DRAWINGS

The objects of the present application will be better understood based on the following description and the appended drawings wherein.

DETAILED DISCLOSURE OF PARTICULAR EMBODIMENTS

Figure 1A:
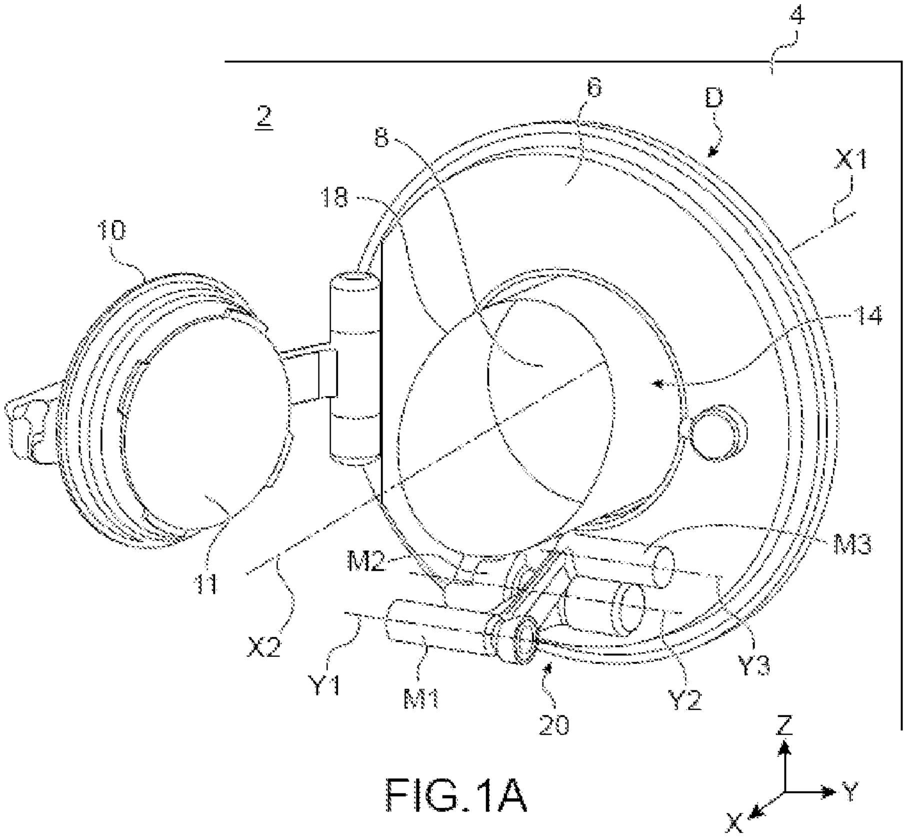
FIG. 1A is a perspective view of the interior of an enclosure provided with a transfer system according to a first embodiment, the transfer system being in a docked position.
Figure 1B:
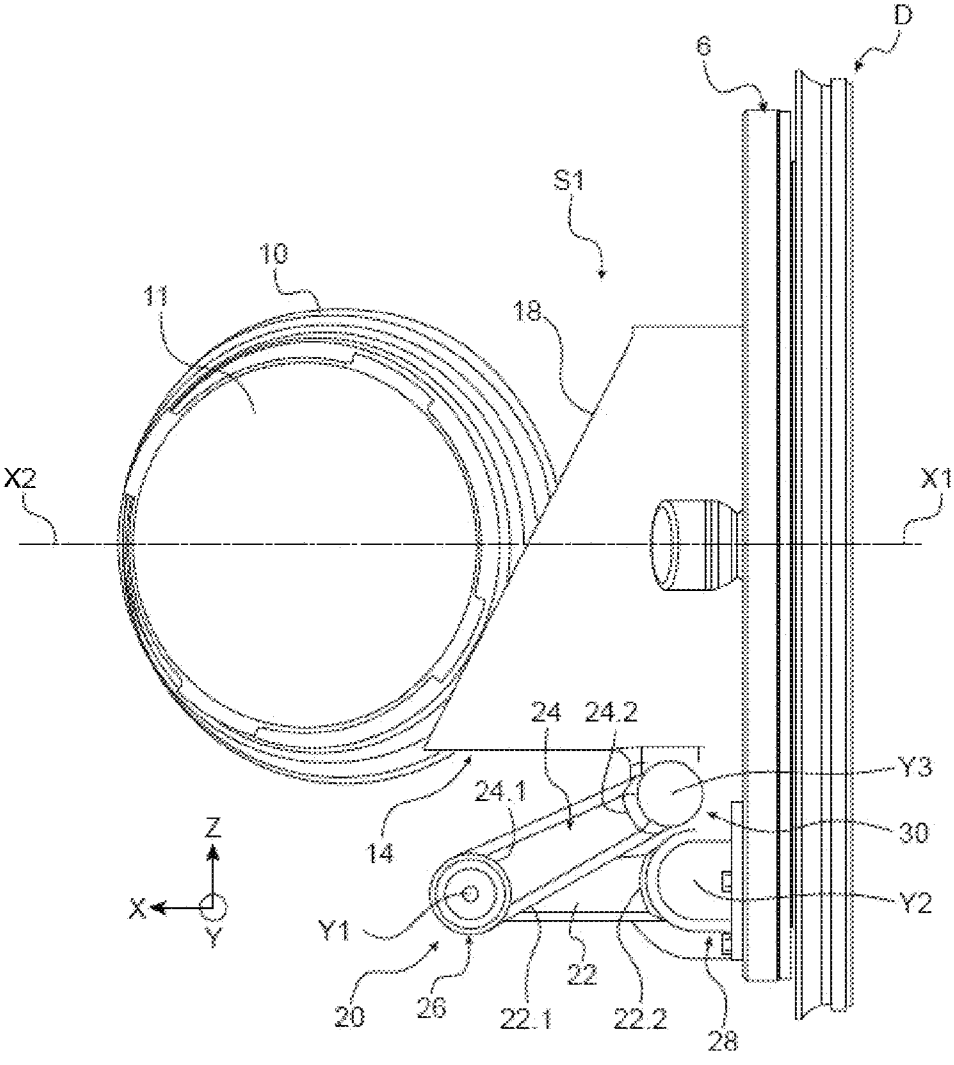
FIG. 1B is a side view of the transfer system of FIG. 1A.
Figure 2:
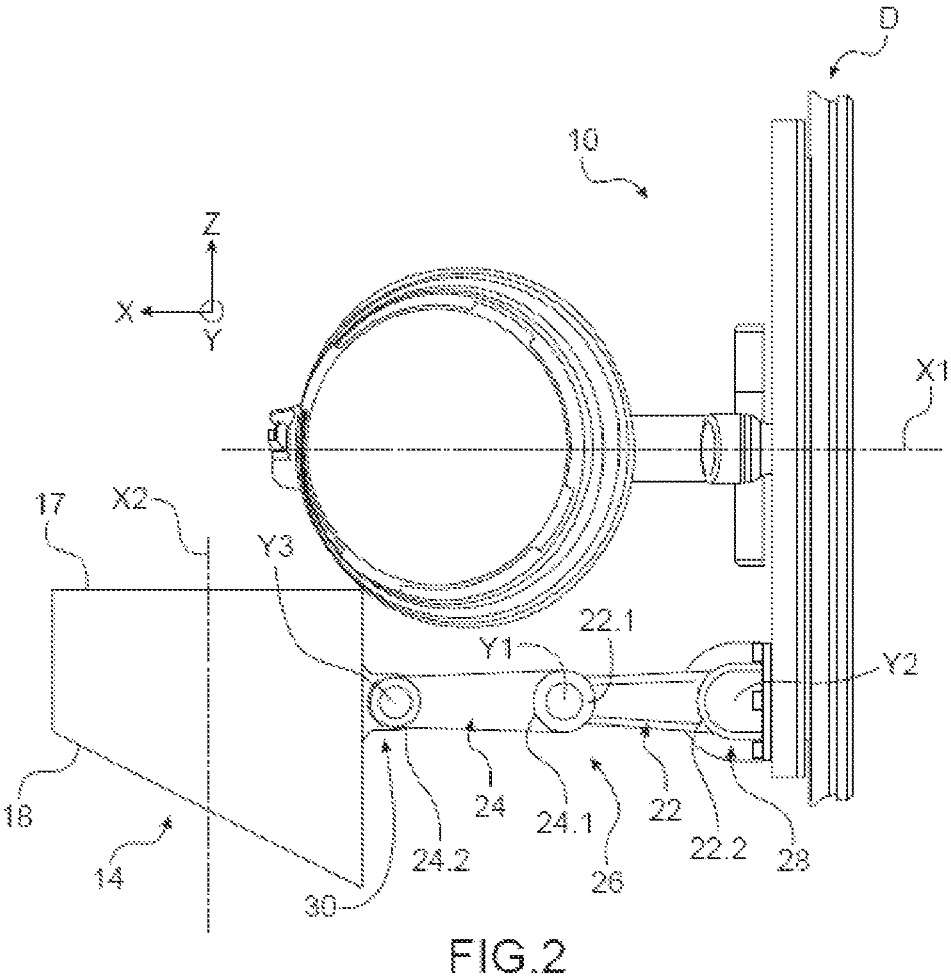
FIG. 2 is a side view of the system of FIG. 1A in a fully deployed state of the hinge device.

In FIGS. 1A, 1B and 2, one could see an example of a sealed enclosure, shown in transparency, provided with an example of a sealed transfer system S1 according to a first embodiment, the transfer system being shown in different positions.

The enclosure 2 includes walls delimiting a sealed volume. At least one of the walls 4 includes a device D for sealed connection to an external sealed system, for example another enclosure, a bag-type rigid or flexible container. The device D is intended to allow connecting the internal volumes of the enclosure and of the external system in a sealed manner and to enable a sealed transfer between the two volumes, to protect the objects contained in the sealed volumes and/or protect the external environment of these objects. For example, the enclosure 2 may be part of an isolator system, specifically a containment area of the isolator, a sterile containment area, or a radioactive containment area, which may be used to manufacture products in the pharmaceutical, agri-food or nuclear industry, for example.

Examples of sealed connection device are described in the document FR 2 695 343 and in the document U.S. Pat. No. 9,754,691.

The sealed connection device D includes a flange 6 mounted in the wall 4 and delimiting an opening 8, a door 10 intended to close the opening 8 in a sealed manner. The sealed connection device D also includes means for connection to an external system, for example a container C (FIG. 10), also including a flange 9 bordering an opening and a door 11 closing said opening in a sealed manner. For example, the means for connecting the flange 6 and the flange 9 are of the bayonet type. Each door is connected to its flange also by a bayonet connection. The connection device features an axisymmetry according to the axis X1.

Figure 10:
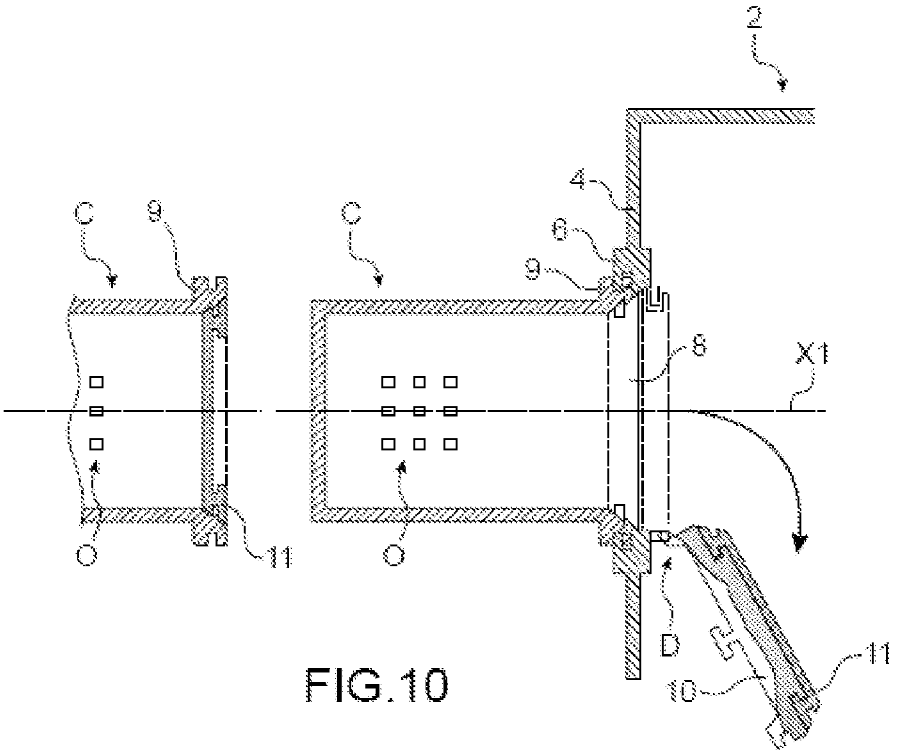
FIG. 10 is a schematic illustration of a sectional top view of an enclosure provided with a sealed connection device to which a container is connected.

An example of a procedure for connecting a container in a sealed manner to the enclosure will be briefly described with reference to FIG. 10. The closed container before connection thereof to the enclosure is shown in dotted lines. The container contains objects O schematically shown, which one wishes to transfer into the enclosure. The transfer system is not shown.

The flange 9 of the container is secured in a sealed manner to the flange 6 of the enclosure by means of a bayonet connection. Simultaneously, the door 11 of the container and the door 10 of the enclosure are secured to each other in a sealed manner by a bayonet connection. The external faces of the doors 10, 11 are isolated from the internal volume of the container and of the enclosure, the assembly formed by the two doors 10, 11 secured to each other may be removed by pivoting it about its axis, and afterwards move into the enclosure, clearing a passage between the two volumes. The two volumes are then in communication in a sealed manner and the transfer of objects between the two volumes may be achieved through the passage.

The flange 9 of the container carries a seal which comes into contact with the external face of the flange 6 of the enclosure, this seal contributes to the delimitation of the passage between the two volumes. The tip of the seal of the container flange that is not in contact with the flange 6 is a line called the “critical line” or “contamination ring” or “ring of concern”.

The enclosure includes a transfer system S1 allowing guiding objects coming from outside towards an area of the internal volume of the enclosure. For example, these objects are caps contained in a bag and which are poured inside the enclosure. The system S1 is intended to facilitate the processing and/or transfer of objects/elements in the enclosure 2, for example to facilitate the supply of objects/elements to a conveyor belt or, during a subsequent processing, transfer into a separate sealed container, through another sealed connection device.

The transfer system S1 includes a part 14 ensuring the guidance of the flow of objects, referred to as a chute and forming some kind of funnel.

In the shown example, the chute 14 is cylindrical with a longitudinal axis X2 with a circular section comprising a docking end 17 (FIG. 2) intended to fit in the passage between the two enclosures and to border the opening when the doors are open, and another end 18, forming a spill end, oriented towards the area where it is desired to direct the object(s) in the enclosure. In the shown example, the spill end is cut by a plane inclined with respect to its axis of revolution X2 conferring a bevelled shape thereon. The chute is intended to take on a docked position in which the docking end 17 is accommodated in the passage formed in the two flanges (FIGS. 1A and 1B), and a separated position, called rest position, in which the chute 14 is moved away from the opening and waits for a new transfer (FIG. 2).

Alternatively, the chute has for example a bent shape, in this case the axis X2 is the axis of the docking end 17.

Advantageously, the docking end 17 is covered with a bead made of a soft material (not shown), for example made of elastomer.

The transfer system includes a device 20 for hinging the chute with respect to the connection device, the hinge device 20 being mounted on the enclosure.

The hinge device 20 includes a first arm 22 and a second arm 24 connected to each other at one of their longitudinal ends 22.1 and 24.1 by a first pivot hinge 26 with an axis Y1

Figure 6:
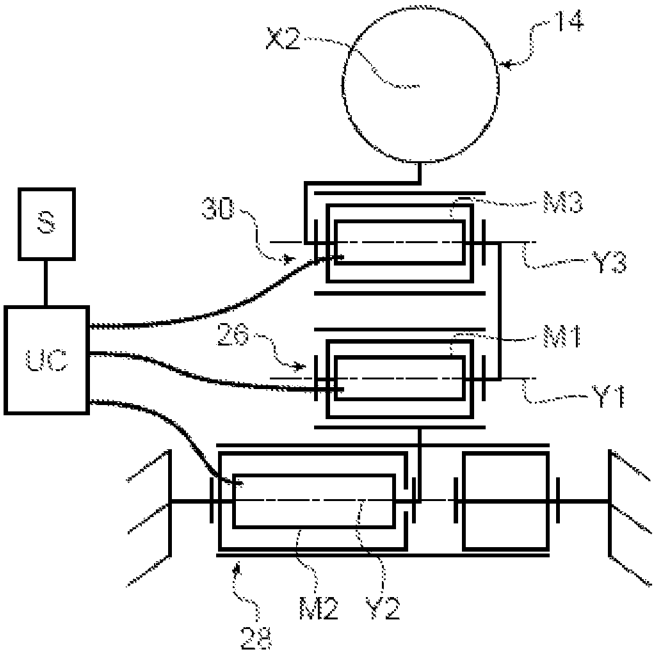
FIG. 6 is an example of a kinematic diagram of the transfer system of FIG. 1A.

(FIGS. 2 and 6). The first arm 22 is fastened to the enclosure by its other longitudinal end 22.2 by a second pivot hinge 28 with an axis Y2. The chute 14 is mounted on the other longitudinal end 24.2 of the second arm by a third pivot hinge 30 with an axis Y3. The axes Y1, Y2 and Y3 are parallel to each other and orthogonal to the axis X1.

The transfer system also includes actuation means for setting the chute 14 in movement relative to the connection device D. Quite advantageously, the hinge device is motor-driven, and even more advantageously, it includes an electric motor M1, M2, M3 at the first 26, second 28 and third 30 pivot hinges.

A control unit UC (schematically shown in FIG. 6) generates individual commands to each electric motor M1, M2, M3. The individual control of the motors offers a great freedom in the configuration of the movement trajectories of the chute relative to the connection device. This great freedom allows adapting to a multitude of environments inside the enclosure and thus avoiding obstacles. Each motor M1, M2, M3 includes an encoder which allows accurately controlling each of the axes of rotation and therefore the relative position of the arms 22, 24 and of the chute 14 and their position relative to the connection device. Advantageously, means S for detecting the configuration of the transfer system and/or the open state of the connection device are provided. The configuration of the trajectories is obtained by programming the control software of the motors by acting on servo-controlled parameters such as the rotational angle and the rotational speed of each of the motors. Sensors may be implemented to know the position of the arms and of the chute relative to the connection device and to the walls of the enclosure.

In the case of an automated connection device, wherein the opening of the door is motor-driven, the control unit may be common to both the control of the transfer system and of the connection device, and it may provide for preventing the closure of the doors when the chute is in place in the passage and/or it may be provided to prevent the actuation of the transfer system as long as the doors are closed.

In a particularly advantageous manner, each motor M1, M2, M3 is integrated in the pivot hinge 26, 28, 30 actuated thereby, as shown in the kinematic diagram of FIG. 6. Each motor includes a shaft which directly forms the axis of the pivot hinge, no reducer, nor gear and/or belt transmission system is implemented. Such an arrangement of the motors allows making a compact transfer system and reduces the embedded mass. For example, these are 24V direct current geared motors equipped with a brake and an encoder.

Because of the axes of the motors being parallel to one another, the hinge device moves in a plane normal to the axes Y1, Y2 and Y3.

A preferred trajectory for moving the chute will now be described with reference to FIGS. 3A to 3C. This trajectory includes the phase of docking the chute on the connection device and the phase of undocking or moving the chute away from the connection device. The trajectory of each of the phases includes at least two portions that are generally the same but in the reverse order.

Figure 3A:
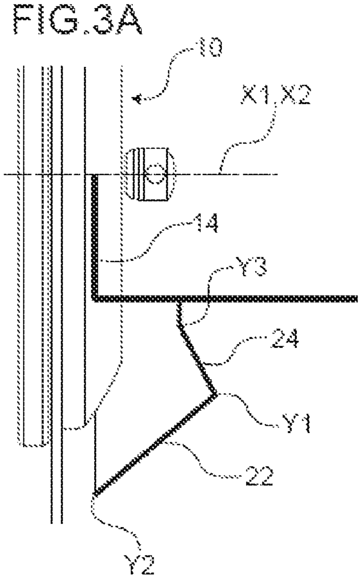
FIGS. 3A to 3C schematically show the trajectory of the chute in the phase of moving away from the connection device which can be obtained thanks to the device according to the invention.

Consider an undocking phase: when the chute is docked on the connection device, its axis X2 is substantially collinear with the axis X1 (FIG. 3A)

In the present application, by "substantially collinear", it should be understood two parallel axes separated by a distance of at most 5 mm, preferably by at most 1 mm or secant at an angle of at most 5°, preferably of at most 1°.

Figure 3B:
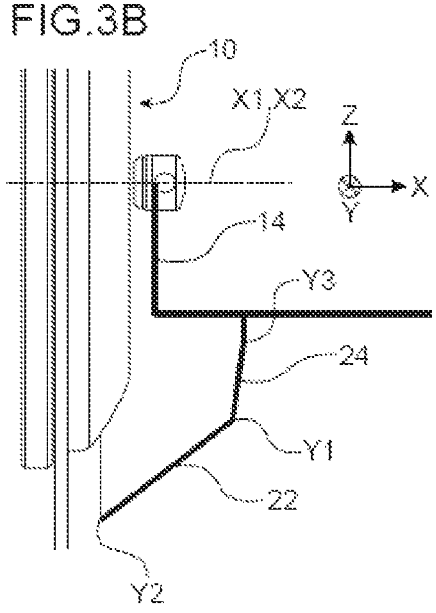

In a first portion of the trajectory shown in FIG. 3B, the chute 14 has a translation movement away from the connection device so that its axis remains substantially collinear with the axis X1 limiting the frictions with the contamination ring and the flanges 6, 9. The movement over this first portion is sufficient for the docking end 17 of the chute to be outside the connection device, it is for example in the range of a few cm, for example about 5 cm. In this portion, two or three motors are controlled at the same time to keep the axis X2 collinear with the axis X1 and ensure the deployment of the hinge device. In the trajectory example of FIG. 3B, the three motors M1, M2 and M3 are activated.

Figure 3C:
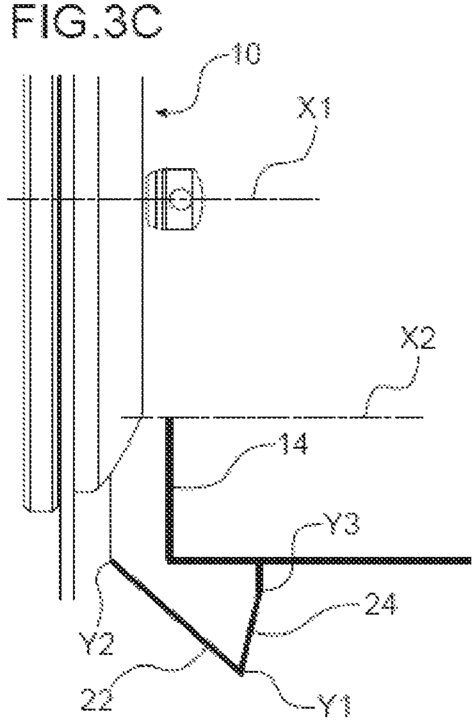

In a second portion of the trajectory shown in FIG. 3C, the motors are controlled so that the chute 14 moves in translation along an axis Z orthogonal to the axis X1 and to the axes Y1, Y2, Y3. In this second portion, two or three motors are controlled at the same time to keep the axis X2 in the direction X. In the trajectory example of FIG. 3C, the three motors M1, M2 and M3 are activated.

The axis X2 of the chute remains parallel to the axis X1 throughout its movement. The chute fits under the connection device against the wall of the enclosure, thereby reducing its size in the enclosure.

The docking trajectory includes the second portion, then the first portion.

Figure 5:
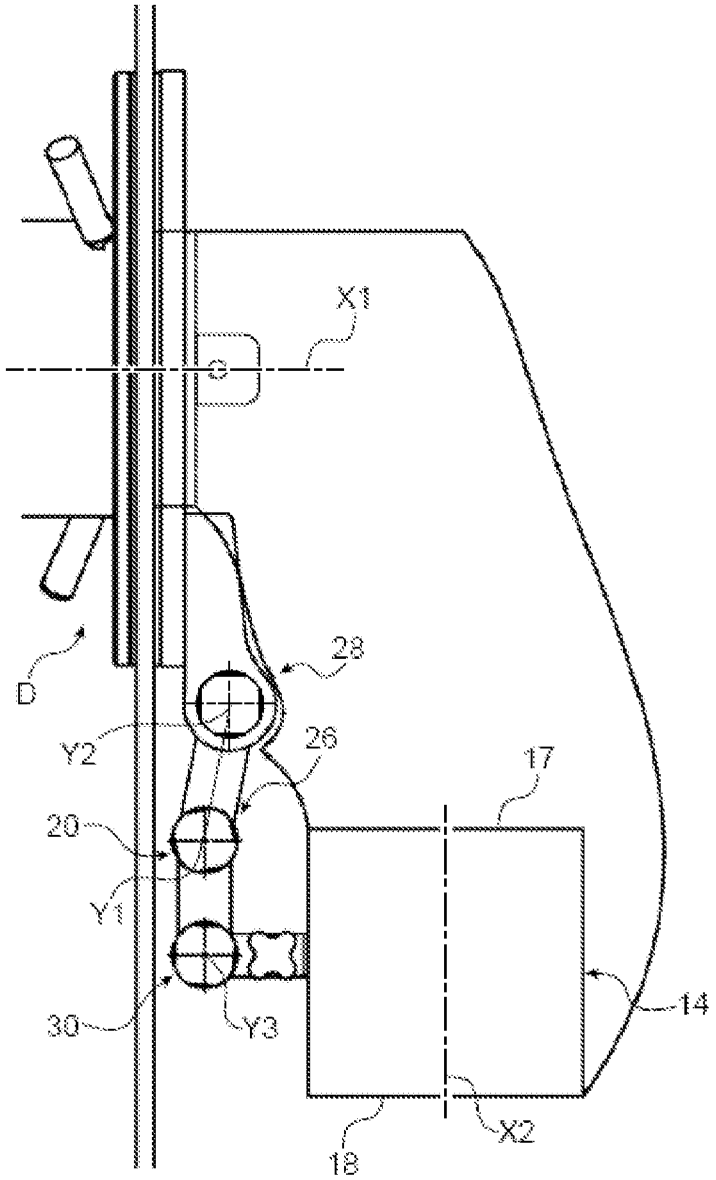
FIG. 5 is a side view of the connection device and of the transfer system in a rest position.

Advantageously, the undocking trajectory may include a third portion in which the motors are actuated to position the arms and the chute along the wall, the chute having its axis X2 parallel to the wall. Advantageously, it consists of the rest position of the chute further limiting its size and its impact on the laminar flow of the enclosure. This position is shown in FIG. 5.

It should be understood that this example of a trajectory is not restrictive. In particular over the second portion, the chute can move according to a partially straight and partially non-straight or only non-straight movement. For example, it may be provided that after the translation movement to move away from the connection device, the motors are controlled to place the axis of the chute in the direction Z, as shown in FIG. 2. The size in the enclosure of the transfer system according to FIG. 2 is considerable. Preferably, the movement over the second portion is selected so as to limit the size of the transfer system in the enclosure.

In the shown example and preferably, the hinge device is fastened on the connection device, more particularly on the flange 6, which avoids having to pierce the wall of the enclosure to fix the transfer system.

Furthermore, when at least one portion of the connection device is automated, for example the control of the latch of the door of the connection device and the opening of the door of the connection device, by implementing one or more electric motors, the electric cables of the motors of the transfer device and of the motors of the connection device are brought together and run through the hole made in the flange.

This assembly allows for a high level of integration and simplifying the operation of equipping an enclosure.

Preferably, the transfer system is fastened on the lower portion of the flange under the opening 8, therefore under the passage, which is favourable in the event of application of a laminar flow in the enclosure. Indeed, this is generally generated at the top of the enclosure. In the case of a connection device mounted on the vertical wall, the transfer system placed under the opening of the connection device, i.e. downstream of the opening when considering the direction of the laminar flow, does not hinder the flow in front of the opening.

Nevertheless, other setups may be considered.

Indeed, it is particularly interesting for the chute to be in the axis of the laminar flow in the rest position. Advantageously, in the rest position the chute is oriented vertically so it is oriented like the laminar flow.

Figure 4:
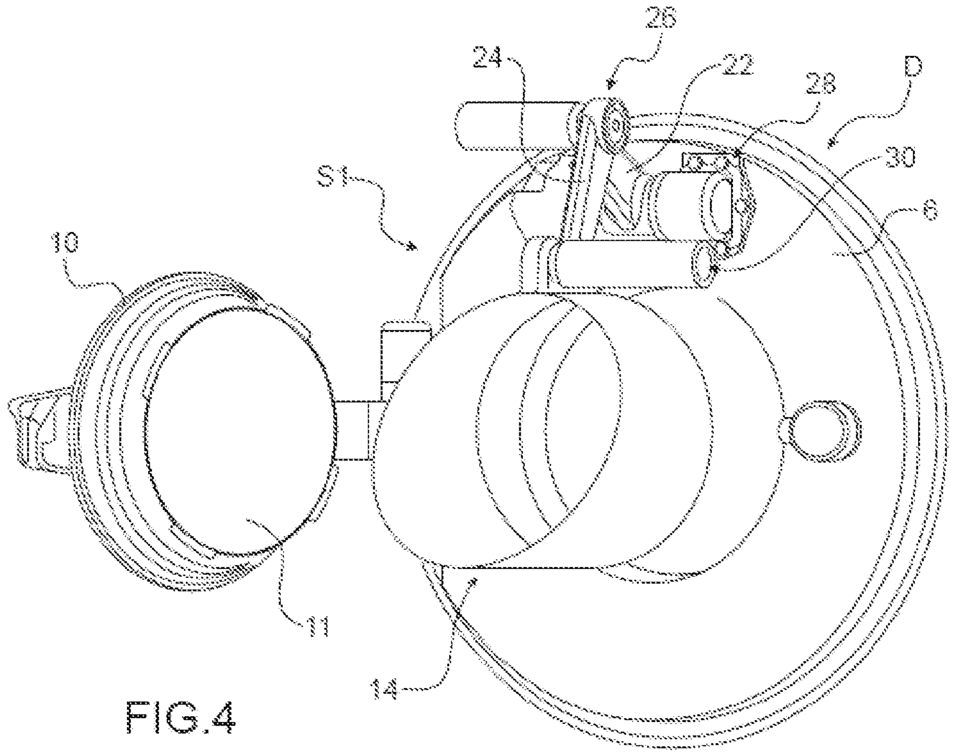
FIG. 4 is a perspective view of the transfer device fastened on the upper portion of the connection device.

In FIG. 4, the transfer system S1 is positioned above the opening of the connection device, the first arm 22 being fastened on the flange 6.

The transfer system may also be fastened to a wall of the enclosure, for example on the wall carrying the connection device, preferably above or below the latter, which can meet the setup and size constraints in the enclosure.

Figure 7:
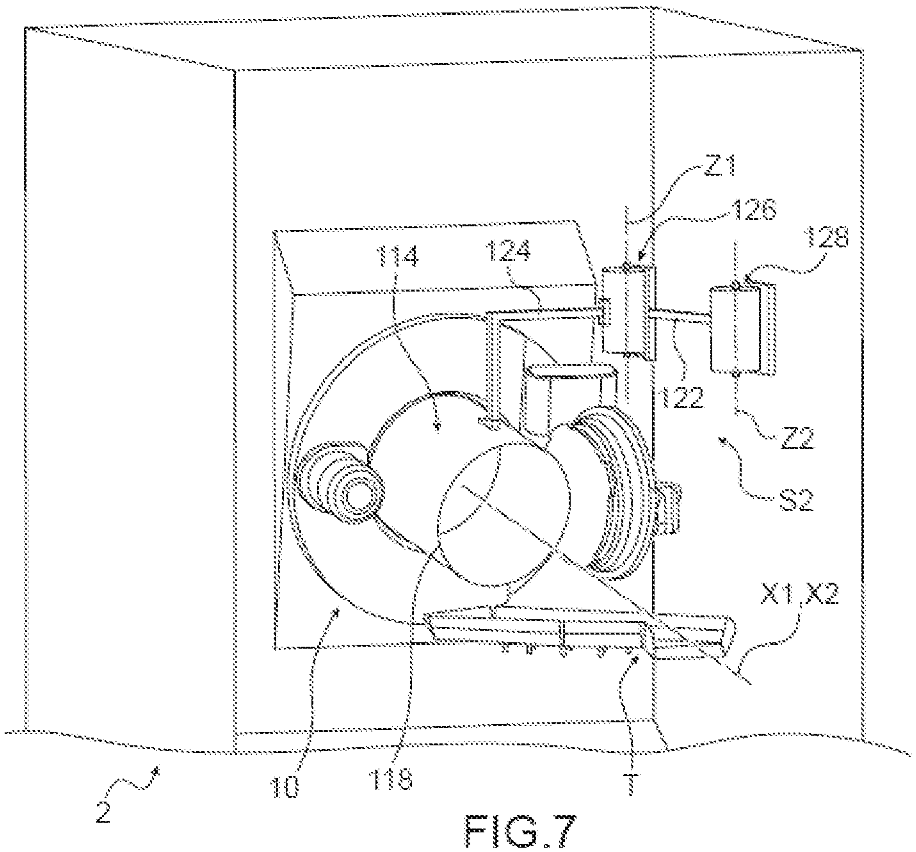
FIG. 7 is a perspective view of the interior of an enclosure provided with a transfer system according to a second embodiment.

In FIG. 7, one could see an example of a second embodiment of a transfer system S2.

In this example, the transfer system S2 is fastened on a wall different from that carrying the connection device, which in this example is a lateral wall, which lies on the side of the hinge of the door of the connection device. The transfer system includes a second arm 124 having an elbow.

In this embodiment, the hinge device includes two arms 122, 124, two pivot hinges 126, 128 with an axis Z1, Z2 respectively and two motors integrated in the pivot hinges 126, 128 respectively, the arm 124 is rigidly fastened to the chute 114. The implementation of a bent arm 124 allows disposing the system at locations that are normally excluded because of the proximity to the door or to the latch. In this example, the bent arm forms a right angle, any other angle may be considered and is selected according to the setup.

This second embodiment allows, in the rest position of the chute, clearing the area for the passage of the components and the area for the passage of the laminar flow. It offers a free volume in the enclosure to handle the components, for example by robots.

In this example, the enclosure 2 includes a conveying system such as a conveying ramp or conveyor belt T over which the objects will travel transferred from the container by the chute. The end 118 of the chute 114 is directly above the conveyor belt T when the chute is in the docked position.

The motors are actuated so that the chute has a movement according to a trajectory including at least one translational movement away from and approaching the connection device. In this configuration, the axes of the hinges are oriented vertically.

Alternatively, the transfer system is fastened on the wall carrying the connection device but is offset laterally with respect to the centre of the connection device. In this configuration, the system is fastened so that the axes of the pivot hinges are horizontal.

A transfer system according to the second embodiment may include two straight arms similar to those of the system S1.

Advantageously, the chute is removably mounted on the hinge device, which allows easily removing, cleaning and sterilising it, for example in an autoclave. An easy cleaning is particularly interesting since the chute is in contact with the components during transfers, and requires careful cleaning.

Figure 8:
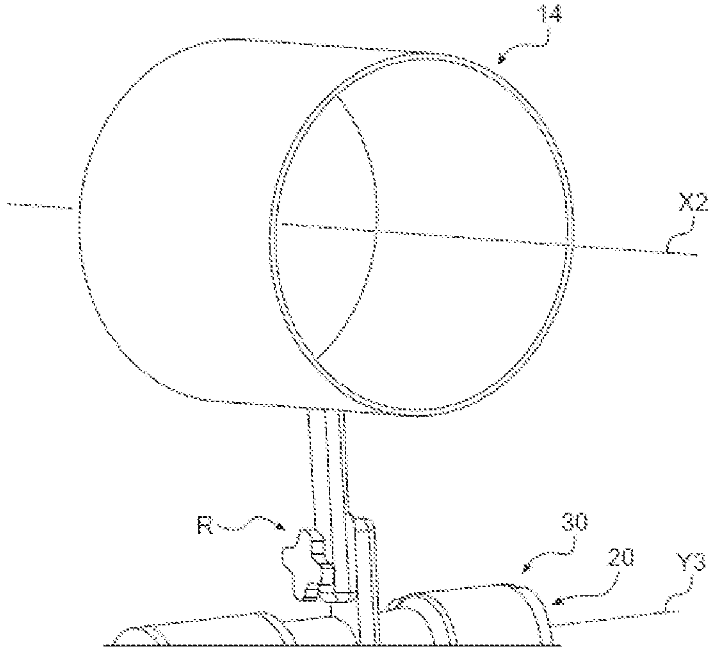
FIG. 8 is a perspective view of an example of a quick connection of a chute on the hinge device.

Preferably, fastening the chute 14 on the hinge device 20 is performed by a quick mount/dismount system R with one hand (FIG. 8).

Figure 9A:
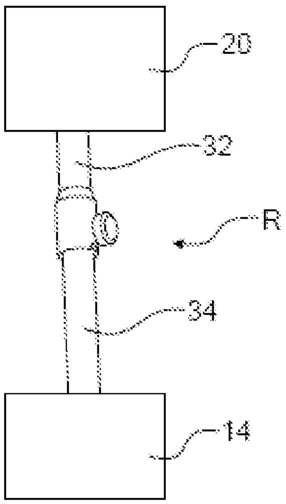
FIG. 9A is a perspective view of an example of a system for quick mount/dismount with one hand that can be implemented between the chute and the hinge device.
Figure 9B:
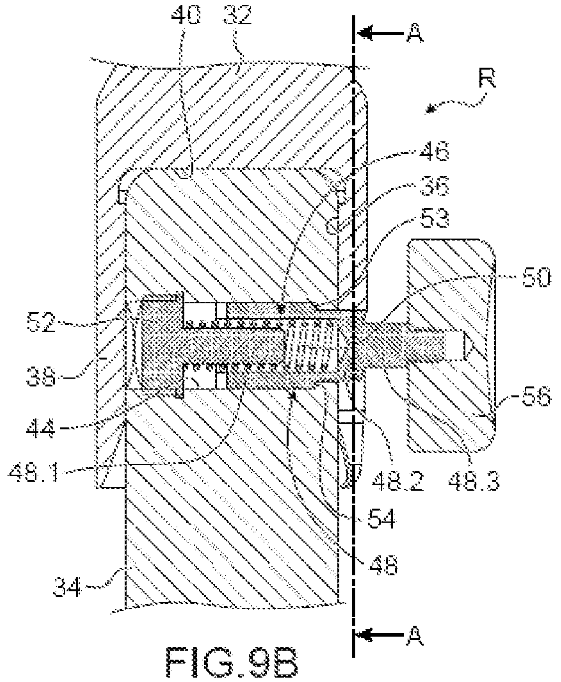
FIG. 9B is a longitudinal sectional view of the system of FIG. 9A.
Figure 9C:
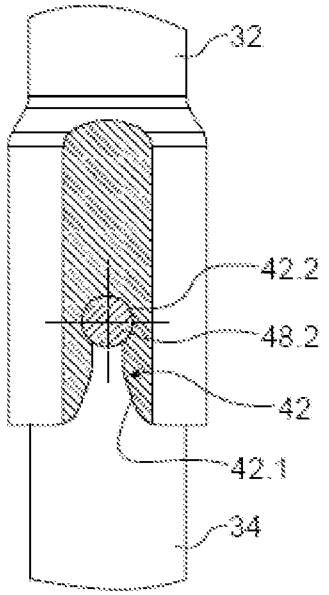
FIG. 9C is a sectional view of the system of FIG. 9A along the plane A-A.

In FIGS. 9A to 9C, one could see an example of a quick mount/dismount system R.

The system R is disposed at a rod 32 fastened to the hinge device 20 and a rod 34 fastened on the chute 14. For example, the rod 32 includes at its free end a housing 36 sized to accommodate the free end of the rod 34. The housing 36 includes a lateral wall 38 and a bottom 40. The lateral wall 38 includes a notch 42 (FIG. 9C) extending longitudinally over the thickness of the housing 36. The notch 42 includes a flared insertion portion 42.1 opening into the free end of the rod 32 and a circular-shaped immobilisation portion 42.2. The rod 34 fastened to the chute includes a transverse bore 44 open-through and accommodating an axial locking mechanism 46 cooperating with the notch 42.

The locking mechanism 46 includes a locking rod 48 movable transversely in the bore 44 and pushed outwards by means of a spring 50 mounted in compression between the rod 48 and a transverse stop 52. In this example, the stop is formed by a bolt screwed into the bore.

The locking rod 48 includes three axial portions 48.1, 48.2 and 48.3 with a decreasing diameter in the direction of the thrust force exerted by the spring.

The transverse bore 44 includes a shoulder 53 cooperating with a shoulder 54 connecting the external lateral faces of the axial portions 48.1 and 48.2. The diameter of the axial portion 48.2 is substantially equal to that of the immobilisation portion 42.2.

The end of the locking rod 48 carries an actuation button 56.

The operation of the system is as follows:

The operator presses on the actuation button 56, moving the locking rod 48 and compressing the spring 50, the portion 48.3 then fits within the immobilisation portion 42.2 of the notch. Its diameter being smaller than the smallest transverse dimension of the notch 42, the portion 48.3 can slide in the notch 42, which allows clearing the end of the rod 34 off the housing 36, and separating the chute from the hinge device.

Placing the chute again on the hinge device is performed by pressing on the actuation button and by inserting the portion 48.3 into the notch 42.

This manipulation may be done with one hand.

The transfer system according to the present description applies to enclosures including any type of sealed connection device and not only those implementing bayonet connection means. The sealed connection device(s) may implement retractable pins, pawls, be of the magnetic type . . . .

The objects described in this application may be implemented in all technical fields requiring a transfer of objects between two closed volumes isolated from the external environment.

REFERENCES

2 enclosure
4 wall
6, 9 flanges
8 opening
10, 11 doors
S1 Transfer System
14 chute
17 docking end
18 spill end
20 hinge device
22 first arm
24 second arm
22.1, 24.1, 22.2, 24.2 longitudinal ends
26 first pivot hinge
28 second pivot hinge
30 third pivot hinge
32, 34 rod
36 housing
38 lateral wall
40 bottom
42 notch

42.1 insertion portion
42.2 immobilisation portion
44 transverse bore
46 axial locking mechanism
48 locking rod
48.1, 48.2, 48.3 axial portions
50 spring
52 transverse stop
53 shoulder
54 shoulder
56 actuation button
114 chute
118 spill end
122 first arm
124 (second) bent arm
126, 128 pivot hinges
S1, S2 transfer systems
D sealed connection device
C container
X1, Y1, Y2, Y3, Z, Z1, Z2 axes
O objects
M1, M2, M3 motors
UC control unit
T conveyor belt
R quick mount/dismount system
S detection means

What is claimed is:

1. A transfer system for a sealed enclosure, said sealed enclosure defining a first closed volume and including at least one sealed connection device with an axis of revolution intended to connect the first closed volume to a second closed volume, said transfer system being intended to be disposed in said sealed enclosure, said transfer system including:

a chute, said chute including:

a docking end with a longitudinal axis configured to cooperate with the sealed connection device; and a spill end, a device for actuating the chute intended to move the chute inside the first closed volume, a hinge device including a first arm and a second arm, a first pivot hinge between a first end of the first arm and a first end of the second arm, a second pivot hinge on a second longitudinal end of the first arm intended to enable a rotational movement of the first arm relative to the interior of the first closed volume and a third pivot hinge between the second arm and the chute, a first electric motor for moving the second arm in rotation relative to the first arm, a second electric motor for moving the first arm in rotation relative to the sealed enclosure, a third electric motor for moving the chute in rotation relative to the second arm, means for controlling at least the first, second and third motors configured so that the trajectory of the chute includes, at least at the end of the phase of approaching the connection device and at the beginning of the phase of moving away from the connection device, a portion of a translational movement over a non-zero distance during which the axis of the docking end and the axis of the device connection are collinear.

2. The transfer system according to claim 1, wherein the first electric motor is integrated in the first pivot hinge and/or the second electric motor is integrated in the second pivot hinge and/or the third electric motor is integrated in the third pivot hinge.

3. The transfer system according to claim 1, wherein the first arm and/or the second arm is or are bent.

4. The transfer system according to claim 1, wherein the chute is removably mounted on the second arm.

5. A sealed enclosure defining a first closed volume and including the transfer system according to claim 1 and a device for sealed connection to a second closed volume, said connection device being mounted in a wall of said sealed enclosure, said connection device including a flange and a door.

6. The sealed enclosure according to claim 5, wherein the hinge device is fastened on a flange of the connection device.

7. The sealed enclosure according to claim 6, wherein the flange includes a passage between the interior and the exterior of the sealed enclosure and through which pass means for electrical connection of the motors.

8. The sealed enclosure according to claim 7, wherein the connection device includes automated means for opening a latch of the door and for pivoting the door activated by at least one motor and means for electrical connection of said at least one motor pass through said passage.

9. The sealed enclosure according to claim 5, including a system for generating a laminar flow located on one side of the connection device and wherein the hinge device is fastened in the sealed enclosure opposite the system for generating a laminar flow with respect to the connection device.

10. The sealed enclosure according to claim 5, wherein the hinge device is fastened on a wall different from that in which the connection device is mounted.

11. The sealed enclosure according to claim 5, including means for detecting the configuration of the transfer system and/or of the open state of the connection device.

12. A method for actuating a transfer system for a sealed enclosure, said sealed enclosure defining a first closed volume and including at least one sealed connection device with an axis intended to connect the first closed volume to a second closed volume, said transfer system being intended to be disposed in said sealed enclosure, said transfer system including:

a chute, said chute including:

a docking end with a longitudinal axis configured to cooperate with the sealed connection device; and a spill end, a device for actuating the chute intended to move the chute inside the first closed volume, a hinge device including a first arm and a second arm, a first pivot hinge between a first end of the first arm and a first end of the second arm, a second pivot hinge on a second longitudinal end of the first arm intended to enable a rotational movement of the first arm relative to the interior of the first closed volume, and a third pivot hinge between the second arm and the chute, a first electric motor for moving the second arm in rotation relative to the first arm, a second electric motor for moving the first arm in rotation relative to the sealed enclosure, a third electric motor for moving the chute in rotation relative to the second arm, said actuation method including a phase of approaching the chute of the connection device to set the chute in a docking position, and a phase of moving the chute away from the sealed connection device to set the chute in a rest position, the chute being moved in translation over a non-zero distance so that the axis of the docking end of the chute is collinear with the axis of the sealed connection device at the end of the approach phase and at the beginning of the separation phase.

13. The actuation method according to claim 12, the sealed enclosure including a device for generating a laminar flow along a wall including the sealed connection device, in which method at the end of the separation phase the chute is disposed so as to be in the axis of the laminar flow.

* * * * *